(12) United States Patent
Brull

(10) Patent No.: US 7,357,282 B2
(45) Date of Patent: Apr. 15, 2008

(54) FISH STRINGER SYSTEM

(76) Inventor: Dwight Joseph Brull, 2001 Sequoia Dr., Kemah, TX (US) 77565

( * ) Notice: Subject to any disclaimer, the term of this patent is extended or adjusted under 35 U.S.C. 154(b) by 478 days.

(21) Appl. No.: 10/843,927

(22) Filed: May 12, 2004

(65) Prior Publication Data

US 2005/0263548 A1    Dec. 1, 2005

(51) Int. Cl.
*A01K 65/00* (2006.01)
(52) U.S. Cl. ..................................... 224/103
(58) Field of Classification Search ........... 224/103, 224/921; 403/166, 304, 325, 359.4
See application file for complete search history.

(56) References Cited

U.S. PATENT DOCUMENTS

| | | | |
|---|---|---|---|
| 3,540,637 A * | 11/1970 | Ezell et al. ............... 224/103 |
| 4,308,643 A | 1/1982 | Montplaisir |
| 4,453,292 A | 6/1984 | Bakker .................... 24/115 G |
| 4,570,836 A * | 2/1986 | Mayo ..................... 224/103 |
| 4,830,244 A | 5/1989 | Brannon |
| 4,960,231 A | 10/1990 | Popovich |
| 4,976,382 A | 12/1990 | Carpenter |
| 5,025,587 A | 6/1991 | Creed |
| 5,078,310 A * | 1/1992 | Ferry ...................... 224/103 |
| 5,112,156 A * | 5/1992 | Boyer ...................... 403/287 |
| 5,407,144 A * | 4/1995 | Ryall ....................... 242/295 |
| 5,492,430 A * | 2/1996 | Jones ...................... 403/109.5 |
| 6,254,303 B1 * | 7/2001 | Falat et al. ............... 403/348 |
| 6,642,321 B1 * | 11/2003 | Okawa et al. ............ 525/398 |

\* cited by examiner

*Primary Examiner*—Nathan J. Newhouse
*Assistant Examiner*—Justin M Larson
(74) *Attorney, Agent, or Firm*—Royston, Rayzor, Vickery & Williams, LLP; Williams P. Glenn, Jr.

(57) ABSTRACT

A fish stringing device which includes a spring loaded connector designed to simultaneously releaseably couple and sheath a rod used to string fish upon a cord. The spring loaded connector includes a rod receptacle inside a helical spring fixed within a tubular shaft housing. The helical spring is formed with a securing member projecting away and across a chord distance at one end of the helical spring. The securing member is slideably coupled to the rod receptacle by a slot diagonally formed in a wall of the rod receptacle. The rod has a groove formed about its circumference at a predetermined distance from a conical end of the rod. The groove releasably couples with the securing member to provide a quick connection by simply inserting and sheathing the conical end of the rod into rod receptacle. Quick disconnection and unsheathing of the rod requires pressing the spring loaded connector to compress the spring which in turn causes the securing member to disengage from the groove and retract along the slot.

2 Claims, 8 Drawing Sheets

Figure 1:
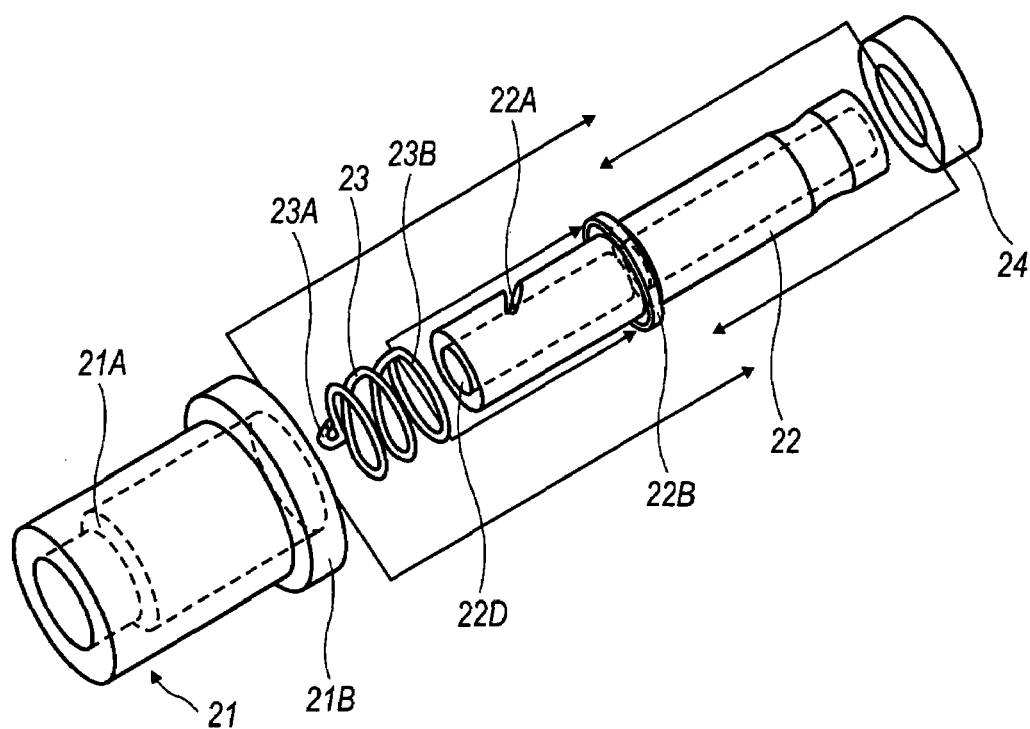

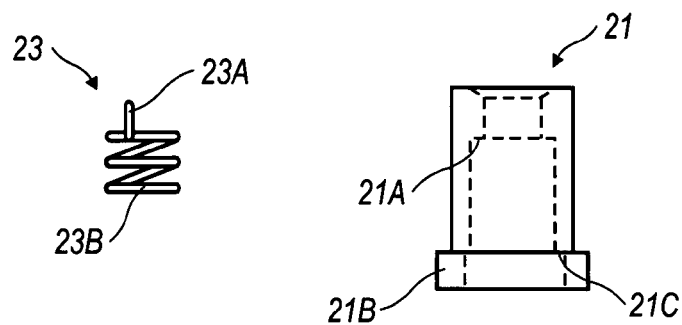
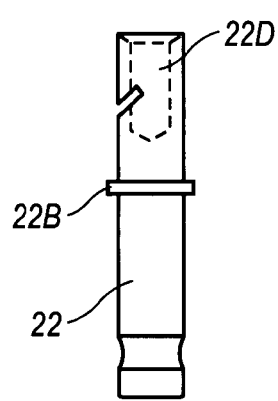
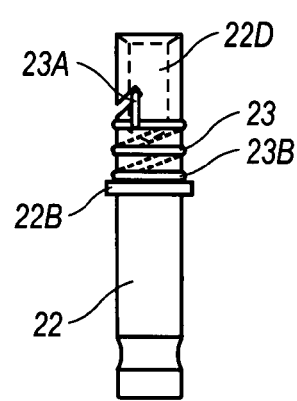
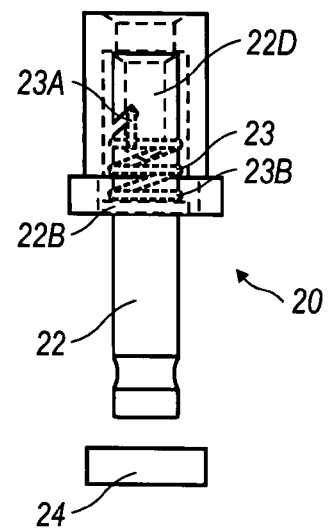
FIG. 14a  FIG. 14b  FIG. 14c

FISH STRINGER SYSTEM

BACKGROUND OF THE INVENTION

1. Field of the Invention

This invention relates to a fish stringing system, and more particularly, to a fish stringing system with a releaseable connector designed to simplify and hasten the attachment and removal of fish to a fish stringer.

The applicable U.S. patent classification No. 403/321; 403/325; 224/103; 224/200; are in close relationship of said invention.

2. Description of the Related Art

Fishing, while viewed as an occupation, can be a recreational activity for many people around the world. Whether it be for relaxation, excitement or to earn income, fishing typically requires a means to secure and transport captured fish. Captured fish can be secured and stored in a basket, net or a fish stringer. The fish stringer is most commonly used to secure and transport the fish from the water to land or boat. Baskets and nets can be cumbersome for wade fishers and operators of boats.

In its most simplest form, the typical fish stringer includes a pre-determined length of cord line connected to a rod which can be inserted through the caught fish to couple it to the cord line; thereafter the rod is releaseably connected to a spring loaded connector. A variety of different fish stringers have been developed over the years—but each are not capable of a quick connection/disconnection of the cord line from the securing point and in-line securement or sheathing of the rod when not in use.

For example, the fish stringer disclosed in U.S. Pat. No. 4,976,382 issued to Carpenter describes a curved stringing needle attached to a cord at one end and the other cord end is releaseably connected to a belt clip. The disclosed benefit of the Carpenter fish stringer does not secure the needle end of the cord to prevent fish uncoupling nor does it provide a sheath for the needle when not in use.

The fish stringer disclosed in U.S. Pat. No. 4,960,231 issued to Popovich, contemplates securement of the cord at one end to the middle of a toggle which is threaded through a loop secured to a wade fisher. The other end of the cord is secured to the middle of a needle. The securement of the cord end to the middle of the needle prevents the strung fish from coming off the end of the cord. The securement of the cord to the middle of the toggle releaseably secures the other end of the cord to a securing loop. The Popovich fish stringer does not sheath the needle when not in use. In fact, two ends of the needle are exposed when not in use and when in use—one end of the needle remains unsheathed which could result in injury to the operator of the fish stringer.

The fish stringer disclosed in U.S. Pat. No. 5,025,587 issued to Creed secures one end of the cord line to a belt clip and the other end to a needle with a shouldered point. The needle slides in a vertical slot formed in the belt clip until the shoulder comes in contact with slot at the bottom of the belt clip. As disclosed, the needle is not securely fixed to the clip—it merely rests on the clip by means of gravity and there is no means to prevent upward movement of the unsheathed needle.

The fish stringer disclosed in U.S. Pat. No. 4,308,643 issued to Montplaisir provides a fish stringer that uses a fish at one end of the cord as a means to prevent other strung fish from being uncoupled from the cord. The other end of the cord is fitted with a needle, not unlike the Carpenter fish stringer. However, securement of the cord calls for the use of a spring loaded cam cleat that releaseably holds the cord to the boat or fisher. While the Montplaisir fish stringer allows for a variety of positive securing points along the cord, it does not provide a sheath for the needle when not in use as claimed and disclosed in the present invention.

The fish stringer disclosed in U.S. Pat. No. 5,078,310 issued to Ferry provides a fish stringer that uses a spring loaded retaining device which secures the needle at a location between its end point and the securement to the cord. It further requires an end cap to be placed over the end needle when not in use. However, the Ferry fish stringer does not provide an inline securement and simultaneous sheathing of the needle as claimed and described in the present invention.

Besides overcoming the deficiencies of the above disclosed patented fish stringers, the present invention provides a quicker, less complicated, safer and overall a far more effective fish stringer as more fully described below.

SUMMARY OF THE INVENTION

An object of the present invention to provide an improved fish stringing system comprising a shaft housing capable of releaseably holding and simultaneously sheathing a free end of a stringer rod attached to one end of a cord. The other end of the cord is connected to a floating stop. Another object of the present invention is to provide a simple and fast means to removeably secure the cord to a securing point, like a belt. In a preferred embodiment, the present invention is configured for use by wade or surf fishers. It another embodiment, the present invention could be secured to a boat or pole.

BRIEF DESCRIPTION OF THE DRAWINGS AND FIGURE DESIGNATION

Figure 1A:
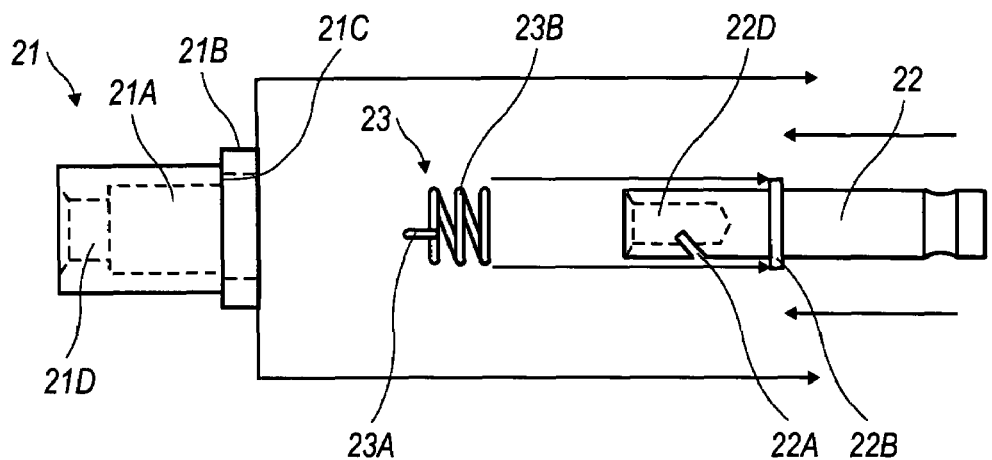
Figure 2:
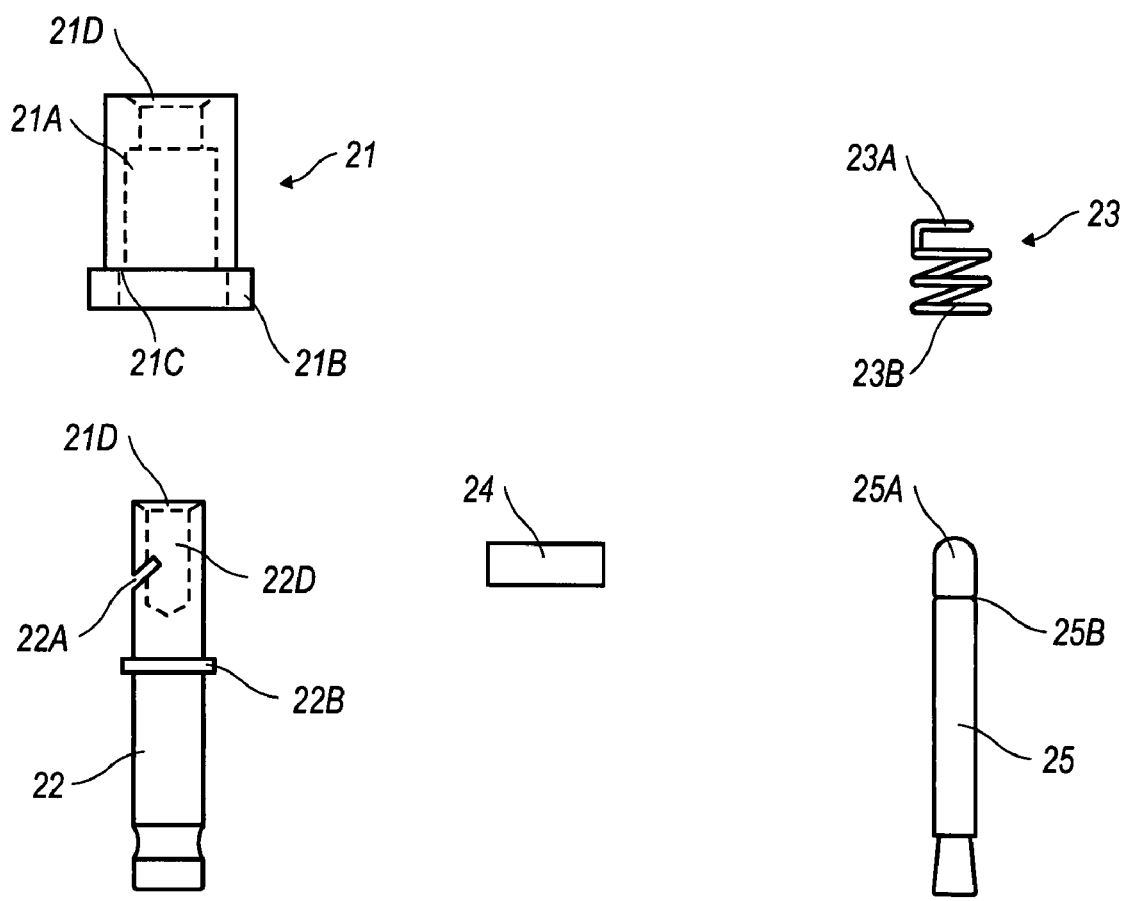
Figure 3:
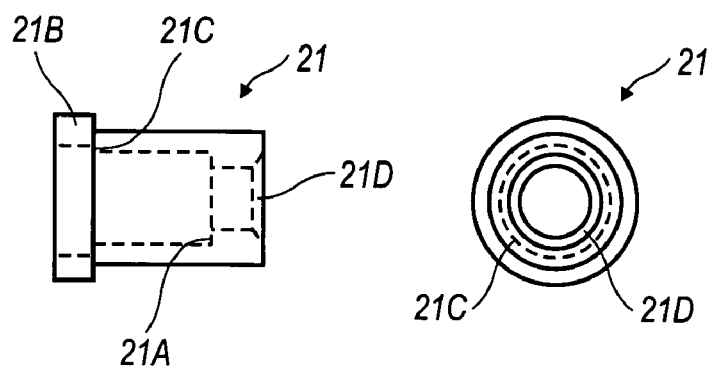
Figure 4:
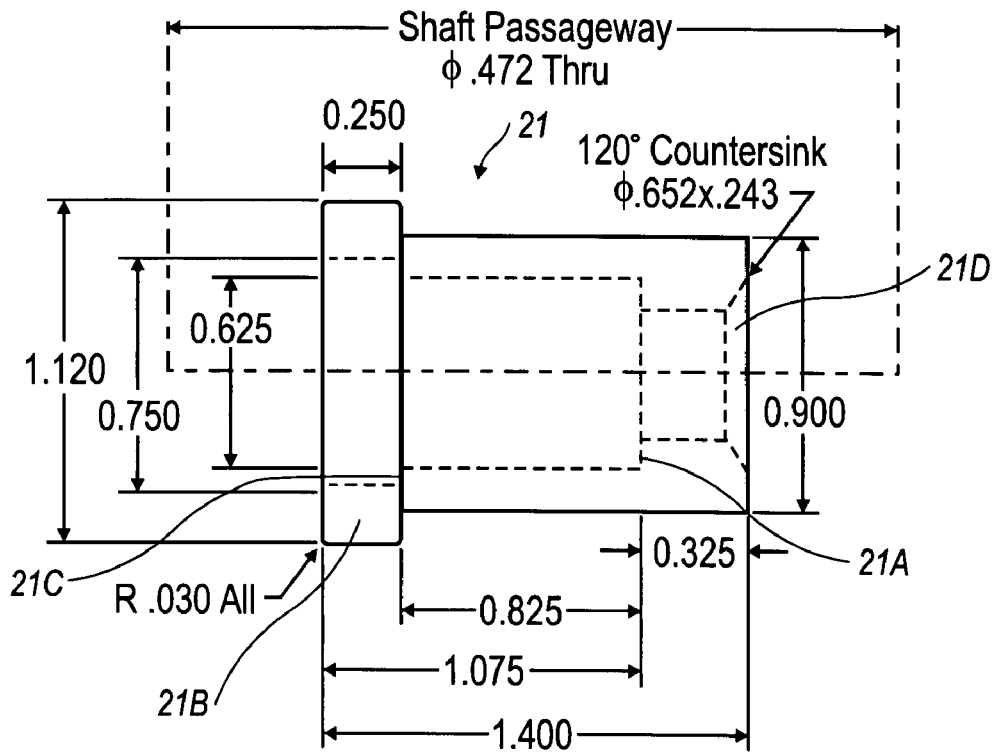
Figure 5:
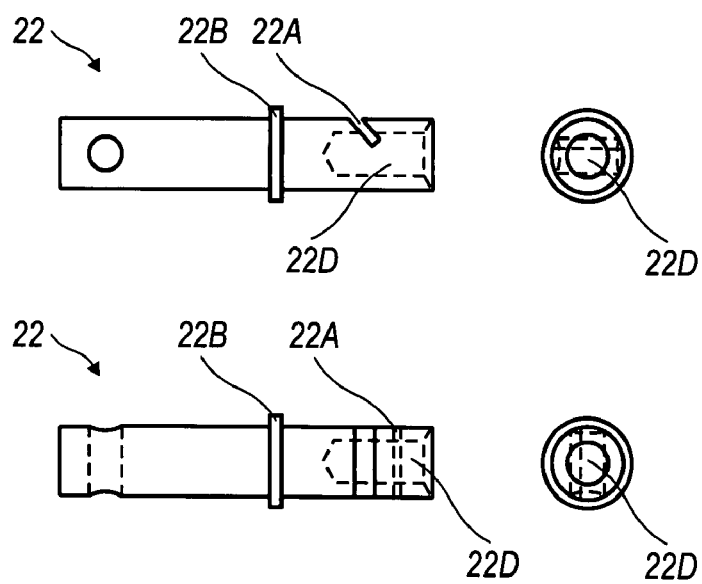
Figure 6:
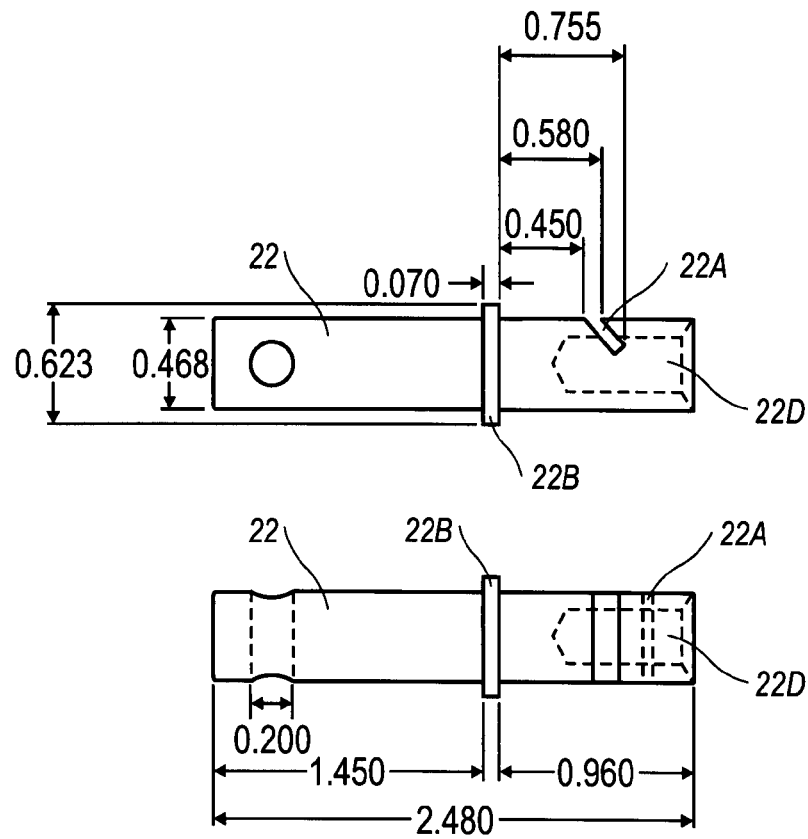
Figure 7:
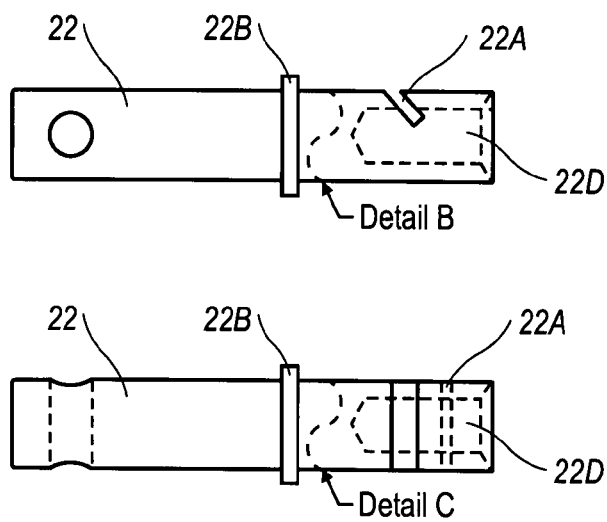
Figure 8:
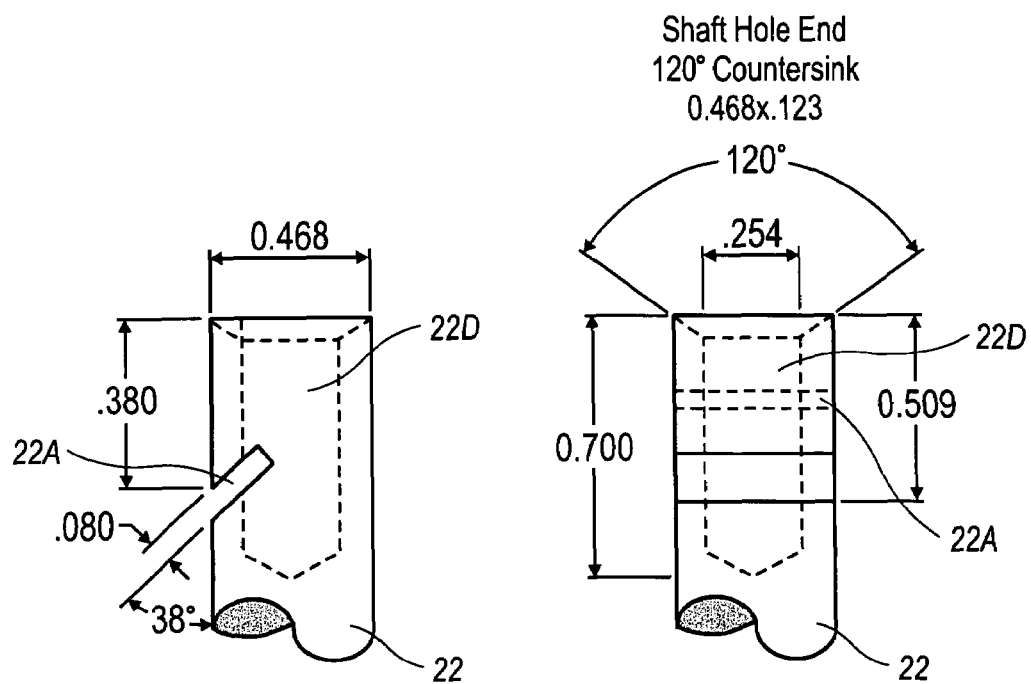
Figure 9:
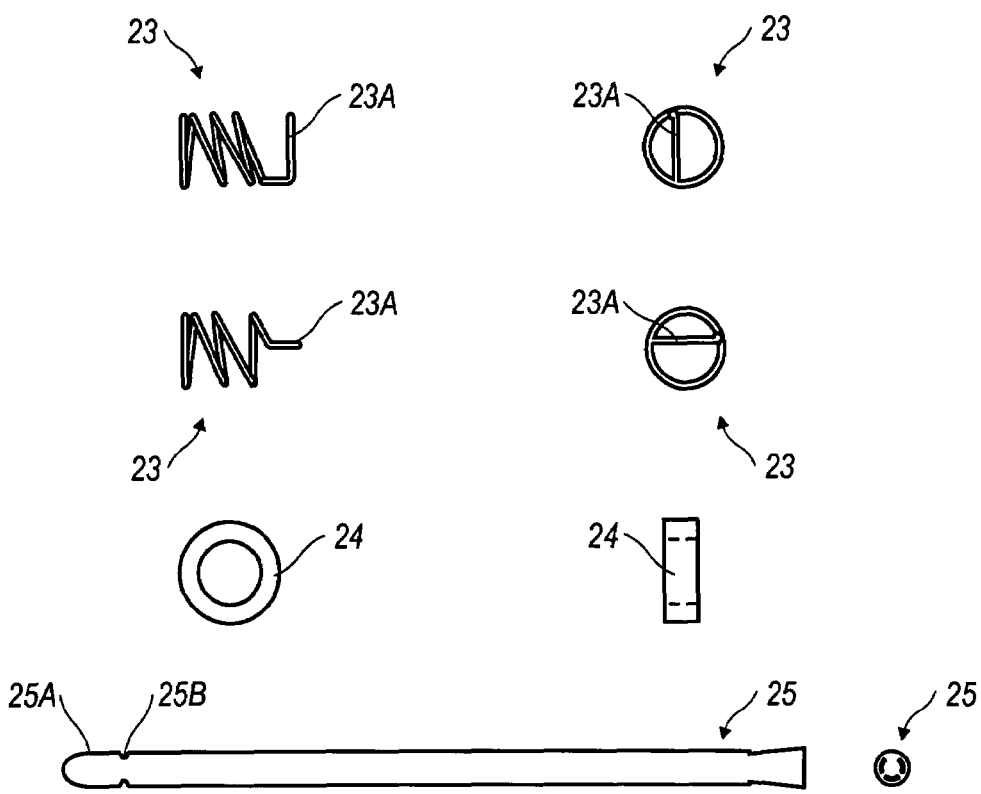
Figure 10:
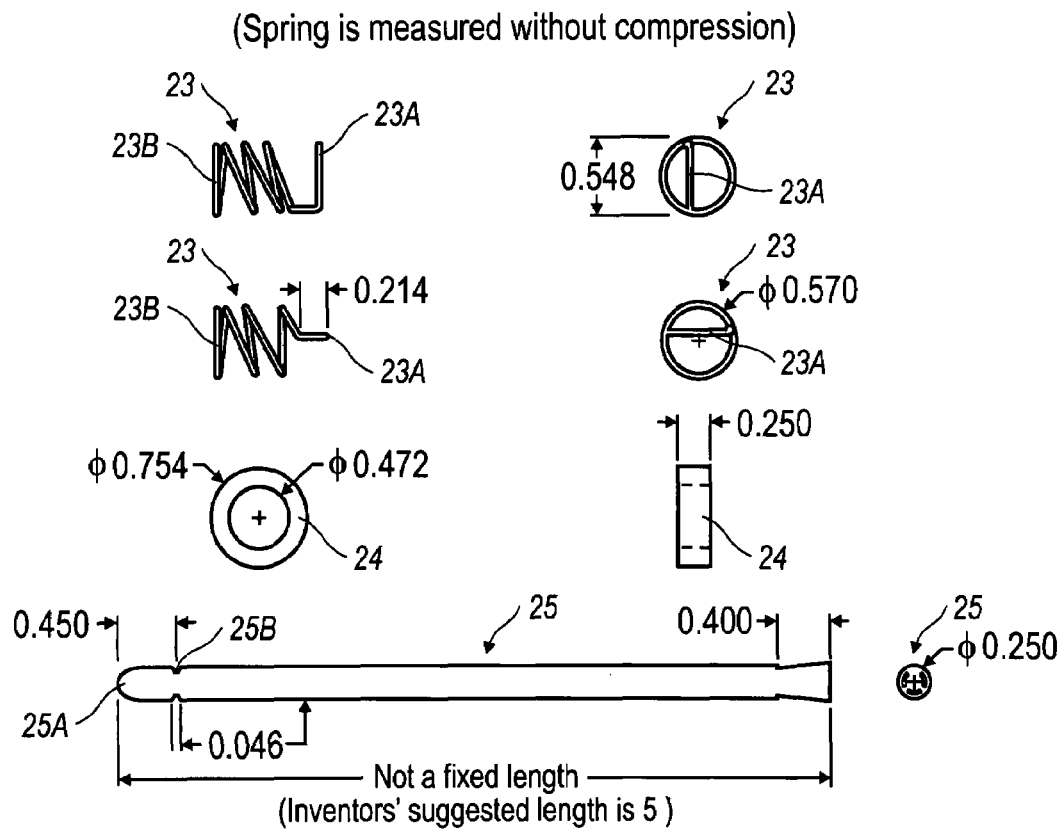
Figure 11:
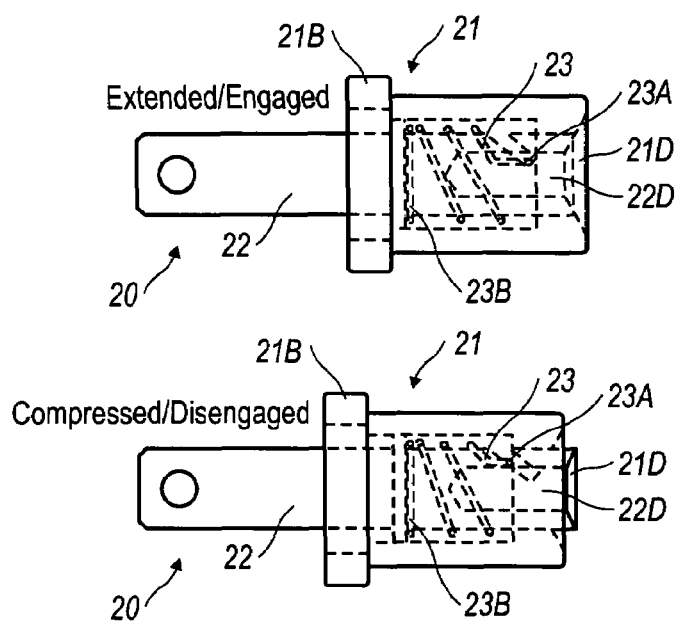
Figure 12:
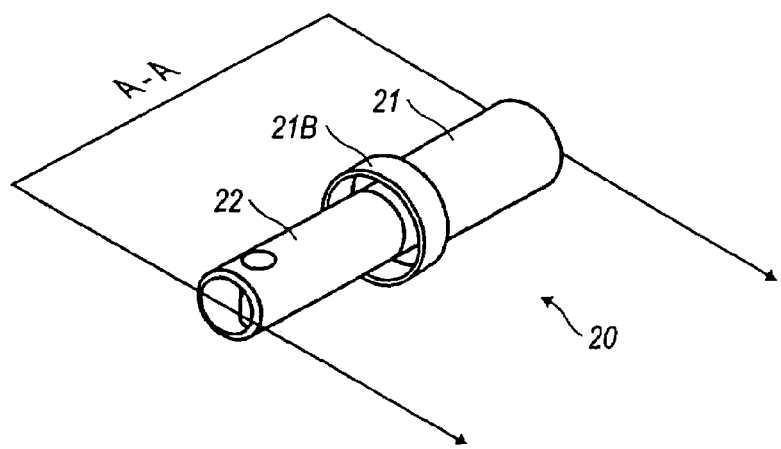
Figure 13:
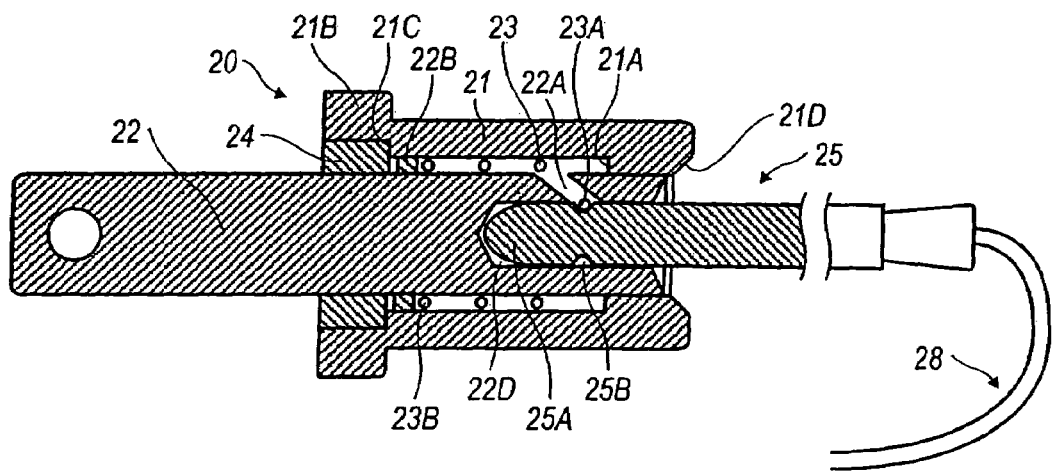

FIG. 1—Exploded isometric view of present invention
FIG. 1A—Exploded side view of the present invention;
FIG. 2—Side views of selected components of the present invention;
FIG. 3—Side and end views of selected components of the present invention;
FIG. 4—Side view of shaft housing with dimensions;
FIG. 5—Side and end views of housing shaft;
FIG. 6—Side and top views of housing shaft with dimensions;
FIG. 7—Side and top views of housing shaft end details;
FIG. 8—Partial views of housing shaft end details with dimensions;
FIG. 9—Side and end views of selected components of the present invention;
FIG. 10—Side and end views of selected components of the present invention with dimensions.
FIG. 11—Side views of present invention in extended/engaged mode and compressed/disengaged mode;
FIG. 12—Isometric view of shaft housing;
FIG. 13—Cross sectional view of present invention; and
FIGS. 14a, 14b, 14c assembly figures for shaft housing.

DETAILED DESCRIPTION OF INVENTION

In its simplest form, the present invention is a fish stringing device which includes a spring loaded connector assembly designed to simultaneously releaseably couple and sheath a rod used to string fish upon a cord. The spring loaded connector assembly includes a rod receptacle inside a helical spring fixed within a tubular shaft housing. The helical spring is formed with a securing member projecting away and across a chord distance across one end of the helical spring. The securing member is slideably coupled to the rod receptacle by a slot diagonally formed in a wall of the rod receptacle. The rod has a groove formed about its circumference at a predetermined distance from a conical end of the rod. The groove releasably couples with the securing member to provide a quick connection by simply inserting and sheathing the conical end of the rod into rod receptacle. Quick disconnection and unsheathing of the rod requires pressing the spring loaded connector assembly to compress the spring which in turn causes the securing member to disengage from the groove and retract along the slot.

The preferred embodiment of the present invention includes a rod 25 securely fixed to a cord 28 for the purpose of threading and coupling fish to the cord 28. The rod 25 has a conical or bullet shaped end region 25A, which facilitates the stringing of fish onto the cord 28. A groove 25 B is formed around rod 25 at a predetermined distance from conical end region 25A. See FIGS. 2 and 13. In a preferred embodiment, rod 25 is constructed from stainless steel material. The cord 28 can be any constructed from any material which is capable of holding a string of fish. In a preferred embodiment the rod 25 is constructed from 304 stainless steel and is approximately 5 inches in length and having a 0.250 inch outside diameter. See FIG. 10. In a preferred embodiment, groove 28 is placed 0.450 inches back from the tip of conical end region 25A and has a width of 0.046 inches. See FIG. 10.

As depicted in FIGS. 1, 1A, 11, 13 and 14, a rod receptacle 22D is placed within a helical spring 23 and then fixed within a tubular shaft housing 21 to form a spring loaded connector assembly 20. Helical spring 23 includes a securing member 23A that projects away and across a chord distance across one end of helical spring 23. See FIGS. 1, 2, 9, and 10. Securing member 23A is slideably coupled to rod receptacle 22D by a slot 22A diagonally formed in a wall of rod receptacle 22D. See FIGS. 1, 1A, 11, 12, 13, 14a, 14b, and 14c.

It is contemplated that rod receptacle 22D is formed in one end of a shaft 22. A slot 22A is formed in shaft 22 at a diagonal which extends from rod receptacle 22D to an exterior surface of shaft 22. See FIGS. 1, 1A, 2, 3, 5, 6, 7, 8, 11, 12, and 13. A spring seat support ridge 22B extends away from and circumscribes an exterior surface of shaft 22. See FIGS. 1, 1A, 2, 5, 6, 7, 11, 12, 13, 14a, 14b, and 14c. In a preferred embodiment, the open end of rod receptacle 22D can be beveled. In a preferred embodiment, the position and dimensions of rod receptacle 22D, slot 22A, and spring seat support ridge 22B are set forth in FIGS. 6 and 8. It is contemplated that shaft 22 can be constructed from a homopolymer acetal such as DELRIN. Shaft 22 can be constructed from other materials which exhibit low coefficient of friction, good bearing characteristics, and able to withstand salt water, and UV rays.

As depicted in FIGS. 1, 1A, 2, 9, and 10, helical spring 23 has two end regions. One end is flat and makes up a spring seat 23B. At the opposite end region is a securing member 23A which extends perpendicularly away and across a chord distance across the diameter of helical spring 23. See FIG. 10. In a preferred embodiment, the positions and dimensions of helical spring 23 are set forth in FIG. 10. It is contemplated that helical spring 23 can be constructed from 304 type stainless steel wire with an outer diameter of 0.040".

A connector assembly 20 is formed from the positioning of helical spring 23 around shaft 22 such that securing member 23A extends across and through slot 22A into rod receptacle 22D. See FIGS. 1, 1A, 11, 13, 14a, 14b, and 14c.

Helical spring 23 rests against a spring seat support ridge 22B. See FIGS. 1, 1A, 11, 13, 14A, 14B, and 14C. Spring seat support ridge 22B allows compression of helical spring 23.

A tubular shaft housing 21 with two opposing open end regions holds shaft 22 and helical spring 23. See FIGS. 1, 1A, 11, 12, 13, 14A, 14B, and 14C. A heightened ridge 21B is circumscribed around and extends away from an exterior surface of tubular shaft housing 21. See FIGS. 1, 1A, 11, 12, 13, 14A, 14B and 14C. A concave beveled interior surface 21D circumscribes an end region of tubular shaft housing 21 distal to heightened ridge 21B. An internal shoulder 21A circumscribes and extends away from an interior surface of tubular shaft housing 21 near concave beveled interior surface 21D. See FIGS. 1, 1A, 3, 13, 14B and 14C. A retainer ring shoulder 21C circumscribes and extends away from an interior surface of tubular shaft housing 21 near the location of heightened ridge 21B. See FIGS. 1, 1A, 3, 13, 14B and 14C. In a preferred embodiment, the dimensions set forth in FIG. 4 provide the location and size of the internal shoulder 21A, heightened ridge 21B, retainer ring shoulder 21C and concave beveled interior surface 21D. As discussed above, tubular shaft housing 21 can be constructed from the same materials as shaft 22.

Shaft 22 and helical spring 23 insert within said tubular shaft housing 21 to form a spring-loaded connector assembly 20. Spring loaded connector assembly 20 positions rod receptacle 22D at the same end as concave beveled interior surface 21D of tubular shaft housing 21. See FIGS. 1, 1A, 11, 12, 13, 14A, 14B, and 14C. A retainer ring 24 is fitted into tubular shaft housing 21 distal to concave beveled interior surface 21D. See FIGS. 1, 9, 10, 12, and 13. Retainer ring 24 centers and aligns shaft 22 within tubular shaft housing 21.

Spring loaded connector assembly 20 simultaneously couples and sheathes rod 25 when securing member 23A engages rod groove 25B. See FIGS. 11, 13, 14A, 14B, and 14C. Uncoupling and exposure of conical end region 25 occurs when spring 23 is compressed between internal shoulder 21A and spring seat support ridge 22B thereby retracting securing member 23A from rod receptacle 22D along slot 22A. As can be appreciated, the present invention does not require actuation of the spring loaded connector assembly 20 to connect rod 25.

Although the description above contains many specifications, these should not be construed as limited the scope of the invention but as merely providing illustrations of some of the presently preferred embodiments of this invention.

What I claim as my invention:

1. A fish stringer system comprising:
   a rod with two ends, wherein a groove is formed in said first rod end and extending around the circumference of said first rod end and a cord is fixed to said second rod end, and said cord capable of retaining the fish
   a rod receptacle formed in a first end of a shaft with a diagonal slot passage extending from said rod receptacle to an outer surface of said shaft and a spring seat support ridge extending away from and circumscribes an exterior surface of said shaft;
   a helical spring with two end regions, wherein said helical spring is flat at said first spring end region and a securing member extends perpendicularly away from said second spring end region;
   said helical spring is positioned around said shaft with said securing member extending across and through said diagonal slot passage into said rod receptacle and said first spring end region is in contact with said spring seat support ridge;

a tubular shaft housing with two opposing open end regions; wherein a heightened ridge circumscribes and extends away from an exterior surface of said first tubular shaft housing open end region, an internal shoulder circumscribes and extends away from an interior surface of said first tubular shaft housing open end region, and a concave beveled interior surface circumscribes said second tubular shaft housing end region;

said helical spring and shaft insert within said tubular shaft housing to form a spring loaded connector, said helical spring and shaft are positioned within said tubular shaft housing such that said rod receptacle extends through said second tubular shaft housing end region when said shaft is pushed to compress said spring;

a retaining ring is inserted into said first tubular shaft housing opening end region to center and align said shaft within said tubular shaft housing; and said spring loaded connector simultaneously couples and sheathes said rod when said securing member engages said rod groove, and uncouples and exposes said rod when said securing member slides along said diagonal slot passage as said helical spring is compressed by movement of said shaft.

2. A fish stringing device comprising:

a rod securely fixed to a cord for the purpose of threading and coupling fish to said cord, wherein said rod comprises a conical end region distal and opposite to a second end region securely fixed to said cord and a groove is formed around said rod at a predetermined distance from said conical end;

a rod receptacle inside a helical spring fixed within a tubular shaft housing to form a spring loaded connector, said helical spring comprises a securing member projecting away and across a chord distance across one end of said helical spring and slideably coupled to said rod receptacle by a slot diagonally formed in a wall of said rod receptacle;

said rod is securely coupled to said spring loaded connector when said conical end is sheathed within said rod receptacle and said groove, positioned within said rod receptacle, is engaged with said securing member; and said rod is uncoupled from said spring loaded connector when said helical spring is compressed to cause said securing member to disengage said groove and retract from said rod receptacle along said slot.

* * * * *